Patented Jan. 14, 1947

2,414,089

UNITED STATES PATENT OFFICE 2,414,089

ESTERS OF HYDROXYDIHYDRONORPOLY-CYCLOPENTADIENES AND UNSATURATED FATTY ACIDS

Herman A. Bruson, Philadelphia, Pa., assignor to The Resinous Products & Chemical Company, Philadelphia, Pa., a corporation of Delaware No Drawing. Application March 13, 1944, Serial No. 526,312

9 Claims. (Cl. 260—410.5)

This invention relates to esters of the hydroxydihydronorpolycyclopentadienes and unsaturated monocarboxylic acids. More specifically, this invention relates to esters of hydroxydihydronordicyclopentadiene and unsaturated aliphatic, cycloaliphatic, and arylaliphatic monocarboxylic acids.

The esters of this invention have the formula

RCOOX wherein X is a dihydronorpolycyclopentadienyl nucleus and R is the non-carboxylated residue of a monobasic carboxylic acid which contains at least one olefinic or acetylenic linkage. The formula for the esters from hydroxydihydronordicyclopentadiene may be represented by

RCOOC$_{10}$H$_{13}$ wherein —C$_{10}$H$_{13}$ is the dihydronordicyclopentadienyl radical and RCO— is an unsaturated carboxylic acyl group, i. e., the non-hydroxylated residue of an unsaturated aliphatic, cycloaliphatic, or arylaliphatic acid.

These new esters are polymerizable, autoxidizable compounds which absorb oxygen from the air to form tough, hard, solvent-insoluble compositions. They are particularly useful as coating materials, serving in this respect as drying oils which have been modified with resins.

The esters can be prepared in several different ways. One method is to react dicyclopentadiene with an unsaturated aliphatic, arylaliphatic, or cycloaliphatic monocarboxylic acid in the presence of an acidic condensing agent such as boron trifluoride, as described in copending application Serial No. 476,639, filed February 20, 1943, now Patent No. 2,395,452 of which the present application is a continuation-in-part, whereby addition of the carboxyl group to the endomethylene cycle of the dicyclopentadiene occurs with a simultaneous molecular rearrangement of the latter to the nordicyclopentadienyl ring system. The reaction may be represented as follows, the first of the two product formulae being the more probable and differing from the second only in the position of the double bond in the terminal cyclopenteno group relative to the position of the functional substituent in the opposite terminal cycle, an endoethylene cyclopentano group:

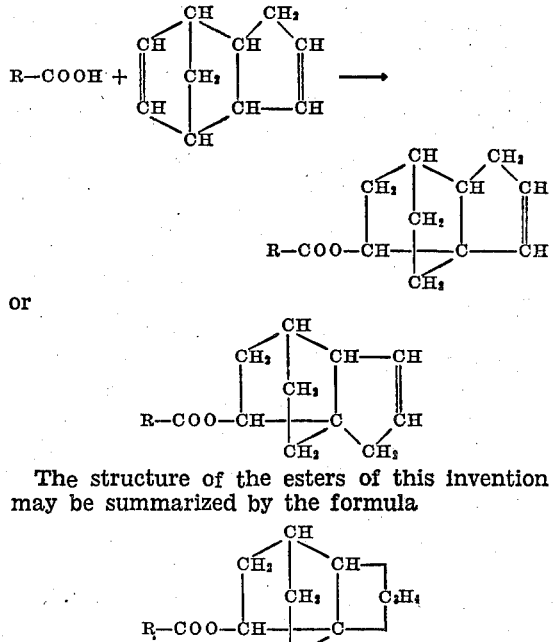

The structure of the esters of this invention may be summarized by the formula

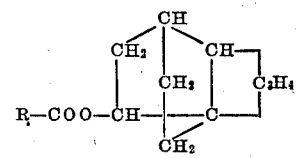

wherein C$_3$H$_4$ represents a propenylene group which in conjunction with the adjoining carbon atoms forms the cyclopenteno group. The functional group is attached at a secondary carbon atom which is flanked by a methylene group and by a tertiary carbon atom. The cyclic system shown also illustrates the structure of the dihydronordicyclopentadienyl group, C$_{10}$H$_{13}$—.

The addition of an unsaturated higher aliphatic or cycloaliphatic carboxylic acid to dicyclopentadiene having two double bonds and one endomethylene cycle per molecule takes place preferably at temperatures from about 50° C. to 145° C., although somewhat lower temperatures may also be used. It is at times advantageous to use an organic solvent, such as naphtha, benzene, toluene, ethylene dichloride, or other organic solvent, in which case the reacting mixture of acid and dicyclopentadiene may be boiled under reflux.

Small amounts of an acidic condensing agent, particularly catalysts such as boron trifluoride and its coordination complexes, or hydrogen fluoride, effectively promote the desired reaction. The coordination complexes are prepared from boron trifluoride and water or an oxygenated organic compound, such as aldehydes, ethers, esters, acids alcohols, and ketones, typified by $BF_3.2CH_3CHO$, $BF_3.C_2H_5OC_2H_5$, $BF_3.C_4H_9OC_4H_9$, $BF_3.CH_3COOC_2H_5$, $BF_3.CH_3COCH_3$, etc. Other catalysts such as sulfuric acid and sulfonic acids may also be used. The catalyst may be removed from the reacted mixture by washing with water or mildly alkaline solution, such as a sodium carbonate or bicarbonate solution, or the like.

The reaction product may be dried with a conventional drying agent, such as sodium sulfate, or the last traces of water removed by distillation of solvent. The product may be used as prepared with or without solvent, or it may be further purified as by treatment with activated clays or charcoal and/or distillation under reduced pressure.

Another method for preparation of the new esters is esterification of the unsaturated acid by conventional methods with hydroxydihydronordicyclopentadiene, a new alcohol obtained by the hydration-rearrangement reaction of dicyclopentadiene with water in the presence of sulfuric acid, as described in copending application Serial No. 476,645, filed February 20, 1943:

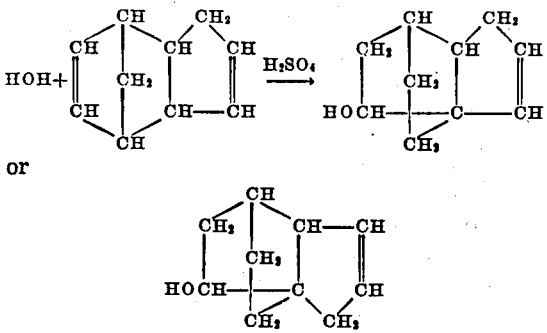

Yet another method for the preparation of the esters of this invention is based on ester interchange or transesterification. This method is particularly useful in the preparation of esters of the more readily polymerizable acids, such as acrylic, methacrylic, or phenyl acrylic acid, and analogues or homologues thereof. By this method, esters of a relatively low molecular weight alcohol and an unsaturated monobasic carboxylic acid are heated with a hydroxydihydronorpolycyclopentadiene in the presence of a transesterification catalyst such as sulfuric acid or sodium ethylate. The more volatile alcohol is distilled off.

By such methods as those described above, the esters of this invention may be prepared from any unsaturated aliphatic type carboxylic acid, including not only purely acyclic acids but also cyclic acids having olefinic linkages. The acids include not only the mono-olefinic acids of the fatty acid series, acrylic, methacrylic, crotonic, vinyl acetic, $\beta,\beta$-dimethyl acrylic, allyl acetic, hydrosorbic, isohydrosorbic, undecylenic, oleic, and the like, but also polyolefinic acids of this series, such as vinyl acrylic, sorbic, linoleic, and linolenic, and acids having triple bonds, such as the undecynoic acids, propiolic, tetrolic, stearolic, and behenolic acids. The acids also include arylaliphatic acids such as cinnamic, $\beta$-benzal propionic, atropic, phenyl propiolic, and the like. Furthermore, the cycloaliphatic acids having one or more olefinic linkages may be used for preparing the esters of this invention.

Particularly useful esters are those derived from the long-chained aliphatic acids of at least eleven carbon atoms, such as linoleic, linolenic, elaeostearic, licanic, oleic, undecylenic, erucic, ricinoleic, clupanodonic and octadecadienic acids (from the dehydration of ricinoleic acid). Mixtures of the unsaturated fatty acids as ordinarily obtained by the hydrolysis of the naturally occurring unsaturated fatty glycerides, such as the drying oil glycerides and semi-drying oil glycerides, are particularly useful for the purpose. These include the fatty acids of linseed oil, tung oil, castor oil, oiticica oil, soya bean oil, cottonseed oil, fish oils, and the like.

The unsaturated cycloaliphatic acids also give highly useful esters. These acids include tetrahydro-$\Delta^3$-benzoic acid, 2,5-endomethylene-$\Delta^3$-6-methyl benzoic acid, 2,5-endomethylene-$\Delta^3$-benzoic acid, 2,5-endomethylene-$\Delta^3$-6-propyl benzoic acid, etc.

The new esters are advantageously used as vehicles in preparing paints, varnishes, and similar coating materials. For this purpose, they may be admixed with at least one oxidation catalyst. The oxidation catalysts include peroxides, such as benzoyl peroxide, tert. butyl hydroperoxide, or lauroyl peroxide, and metallic driers, such as the oil-soluble salts of heavy metals, typified by lead, cobalt, manganese, and other polyvalent metals supplying siccative action, and of carboxylic acids imparting oil-solubility to the salt, including naphthenic acids, long-chained fatty acids such as linoleic and linolenic, and ether acids, such as butoxyacetic or octyloxyacetic acids. Mixtures of peroxides and metallic driers are particularly efficacious.

When coatings comprising an ester of this invention and one or more oxidation catalysts are applied to a surface and exposed to air and/or preferably baked at 130° to 190° C., they are converted to hard, tough films which are substantially mar-proof and which possess remarkable adhesion to metal. The hardened films are insoluble in all common organic solvents and are very water-resistant. While the esters alone may serve as vehicles for coating compositions, they may also be mixed with drying oils, alkyd resins, hydrocarbons, such as rubber or cyclized rubber, and other oils and resins. The esters of this invention are also useful as impregnants for sand cores in molding.

The following examples illustrate the preparation of these esters:

*Example 1*

A mixture of 110 grams of undecylenic acid, 79 grams of dicyclopentadiene, and ten grams of boron trifluoride-diethyl ether, $BF_3.C_2H_5$—O—$C_2H_5$, was stirred at 55°–60° C. for five hours. The mixture was cooled, washed with water, taken up in toluene, and the toluene solution washed successively with dilute soda solution and water. The toluene was removed by evaporation, leaving a residual oil which was distilled under reduced pressure to yield 85 grams of dihydronordicyclopentadienyl undecylenate, boiling at 185°–190° C./2 mm. It is a pale yellow oil.

*Example 2*

A mixture of 141 grams of oleic acid, 66 grams of dicyclopentadiene, and 10 grams of boron trifluoride-diethyl ether complex was stirred at 55° C. for six hours. The mixture was washed, neutralized, and worked up as in Example 1. The resulting product, dihydronordicyclopentadienyl oleate, distilled at 240°–250° C./2 mm. as a pale yellow oil. The yield was 115 grams.

*Example 3*

In a similar manner, 141 grams of linseed oil fatty acids (consisting essentially of linoleic and linolenic acids) was reacted at 55° C. for six hours with 66 grams of dicyclopentadiene in the presence of 10 grams of $BF_3 \cdot C_2H_5—O—C_2H_5$. The washed, neutralized product distilled at 245°–250° C./2 mm. as a light yellow oil, the analysis of which showed it to be the ester of hydroxydihydronordicyclopentadiene and the mixed acids of linseed oil.

*Example 4*

A mixture of 280 grams of octadecadienic acid (obtained by hydrolysis of dehydrated castor oil), 200 grams of hydroxydihydronordicyclopentadiene, 300 grams of toluene, and 3 grams of concentrated sulfuric acid is boiled under a reflux condenser attached to a water trap for several hours until 18 grams of water has been collected in the trap. The product is cooled to 25° C., stirred with 10 grams of powdered calcium hydroxide for twenty minutes, filtered, and distilled. After the toluene has come over, vacuum is applied and the excess hydroxydihydronordicyclopentadiene distilled off. At 235°–250° C./2 mm. the dihydronordicyclopentadienyl octadecadienate comes over as a pale yellow oil in 90% yield.

In the same manner as described in Example 4, the esters of hydroxydihydronordicyclopentadiene and elaeostearic acid, licanic acid, or clupanodonic acid are obtained as pale yellow oils.

*Example 5*

A mixture of 150 parts of cinnamic acid, 170 parts of hydroxydihydronordicyclopentadiene, 300 parts of toluene, and 3 parts of sulfuric acid was boiled in a vessel equipped with a reflux condenser having a water trap. The reaction was continued until no more water was evolved. The reaction mixture was then cooled and washed with water, with a dilute soda ash solution, and with water again. The toluene was distilled therefrom and the residual oil heated under reduced pressure. A dark, thick oil remained which was essentially dihydronordicyclopentadienyl cinnamate. It had definite drying properties, thickening when heated with air, and hardening in films containing a siccative.

*Example 6*

A mixture consisting of 132 parts of dicyclopentadiene, 172 parts of crotonic acid, 10 parts of naphthalene sulfonic acid, and 10 parts of 40% sulfuric acid was heated under reflux at 95°–105° C. for five hours with constant stirring. The product was cooled, washed with water, with soda solution, and finally with water, then dried and distilled under reduced pressure.

The dihydronordicyclopentadienyl crotonate having the formula:

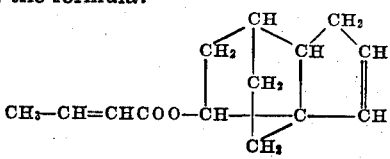

distills over as a pale yellow oil at 128°–130° C./3 mm.

*Example 7*

A mixture of 150 grams of hydroxydihydronordicyclopentadiene, 100 grams of 2,5-endomethylene-$\Delta^3$-tetrahydro-6-methyl benzoic acid, 100 grams of toluene, and two cc. of concentrated sulfuric acid was boiled under a reflux condenser attached to a water trap until no more water distilled over. This required about three hours. The reaction mixture was cooled, washed with water and with dilute soda solution, dried, and distilled in vacuo. The desired ester having the formula

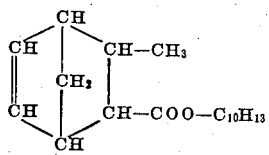

wherein $C_{10}H_{13}$ is the dihydronordicyclopentadienyl radical, distilled over at 188°–195° C./5–6 mm. as a colorless oil having a pleasant odor.

*Example 8*

A mixture consisting of 540 grams of hydroxydihydronordicyclopentadiene, 600 grams of methyl methacrylate, 6 grams of di-$\beta$-naphthol, and 6 cc. of 98% sulfuric acid was heated in a flask fitted with an 18-inch column packed with glass rings leading to a condenser set for distillation. The heating was so regulated that the vapor temperature at the top of the column was held at 63°–65° C. until no more methanol-methyl methacrylate azeotropic mixture distilled. To complete the reaction, the vapor temperature was finally permitted to rise to 88° C.

The crude dihydronordicyclopentadienyl methacrylate was washed with water and with sodium carbonate solution, dried, and distilled in vacuo. The product boiling at 136°–138° C./13 mm., amounting to about 400 grams, consisted essentially of the desired dihydronordicyclopentadienyl methacrylate:

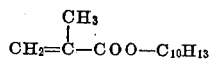

Upon redistillation, the pure product boiled at 126°–133° C./8 mm. It was a colorless oil.

*Example 9*

In the same manner as that described in Example 8, a mixture was prepared consisting of 450 grams of hydroxydihydronordicyclopentadiene, 517 grams of methyl acrylate, 6 grams of di-$\beta$-naphthol, 6 cc. of 98% sulfuric acid, and 300 cc. of benzene. The heating was regulated so that the vapor temperature of the distillate was held at 58°–65° C. The washed, dried, distilled dihydronordicyclopentadienyl acrylate boiled at 116°–122° C./3–5 mm. It was a colorless oil.

A sample of dihydronordicyclopentadienyl linoleate, as obtained in Example 3, was mixed with lead, cobalt, and manganese naphthenates as a siccative so that the metal content on the basis of the ester was 0.50% lead, 0.02% cobalt, and 0.02% manganese, respectively. A film of this mixture was formed on a steel panel which was then baked for an hour at 150° C. to form a hard, tough, adherent, varnish-like coating. In a similar manner, other unsaturated fatty acid esters of hydroxydihydronordicyclopentadiene and oleic, undecylenic, clupanodonic, elaidic, elaeostearic, or licanic acids, for example, give varnish-like coatings.

While in the above examples essentially pure dicyclopentadiene or the alcohol derived therefrom by addition of water and rearrangement to the norcyclopentadienyl system is used, there may be used with similar results higher polycyclopentadienes or mixtures of dicyclopentadiene and higher crystalline polycyclopentadienes having two double bonds per molecule. There may be prepared mixtures of crystalline di-, tri-, tetra-, and penta-cyclo-pentadiene having two double bonds and one to four endomethylene cycles per molecule. These undergo the same esterifying reactions as pure dicyclopentadiene. Further details of the behavior of these polycyclopentadienes are given in the parent application. The polyesters of the various hydroxydihydronorpolycyclopentadienes of the type aforesaid all have the drying properties above described and are useful in coating compositions.

I claim:

1. An ester of hydroxydihydronorpolycyclopentadiene and an unsaturated monobasic carboxylic acid selected from aliphatic, cycloaliphatic, and arylaliphatic acids.

2. An ester of hydroxydihydronordicyclopentadiene and an unsaturated monobasic carboxylic acid selected from aliphatic, cycloaliphatic, and arylaliphatic acids.

3. An ester of hydroxydihydronordicyclopentadiene and an unsaturated aliphatic monobasic carboxylic acid.

4. An ester of hydroxydihydronordicyclopentadiene and an unsaturated cycloaliphatic monobasic carboxylic acid.

5. An ester of hydroxydihydronordicyclopentadiene and an aliphatic monobasic carboxylic acid having an olefinic linkage.

6. An ester of hydroxydihydronordicyclopentadiene and an unsaturated, acylic, aliphatic monocarboxylic acid having at least eleven carbon atoms.

7. An ester of hydroxydihydronordicyclopentadiene and an unsaturated fatty acid from the hydrolysis of an unsaturated natural drying oil fatty glyceride.

8. An ester of hydroxydihydronordicyclopentadiene and linseed oil fatty acids.

9. An ester of hydroxydihydronordicyclopentadiene and octadecadienic acid.

HERMAN A. BRUSON.